2 Sheets--Sheet 1.

D. A. GLENN.
Binders' Attachments for Harvesters.

No. 153,562. Patented July 28, 1874.

WITNESSES.
Frederick A. Herring
J. H. Lawlor

INVENTOR.
David A. Glenn
By Gridley & Warner
attys

2 Sheets--Sheet 2.

D. A. GLENN.
Binders' Attachments for Harvesters.

No. 153,562. Patented July 28, 1874.

WITNESSES.
Frederick A. Herring.

INVENTOR.
David A. Glenn
By Gridley & Warner
Attys

UNITED STATES PATENT OFFICE.

DAVID A. GLENN, OF ROCHELLE, ILLINOIS.

IMPROVEMENT IN BINDERS' ATTACHMENTS FOR HARVESTERS.

Specification forming part of Letters Patent No. 153,562, dated July 28, 1874; application filed June 26, 1874.

*To all whom it may concern:*

Be it known that I, DAVID A. GLENN, of Rochelle, in the county of Ogle and State of Illinois, have invented a new, useful, and Improved Binder's Attachment for Harvesters, of which invention the following is a full, clear, and exact description, which will enable others skilled in the art to make and use the said improvement, reference being had to the accompanying drawing, forming a part hereof, and in which—

Figure 1:
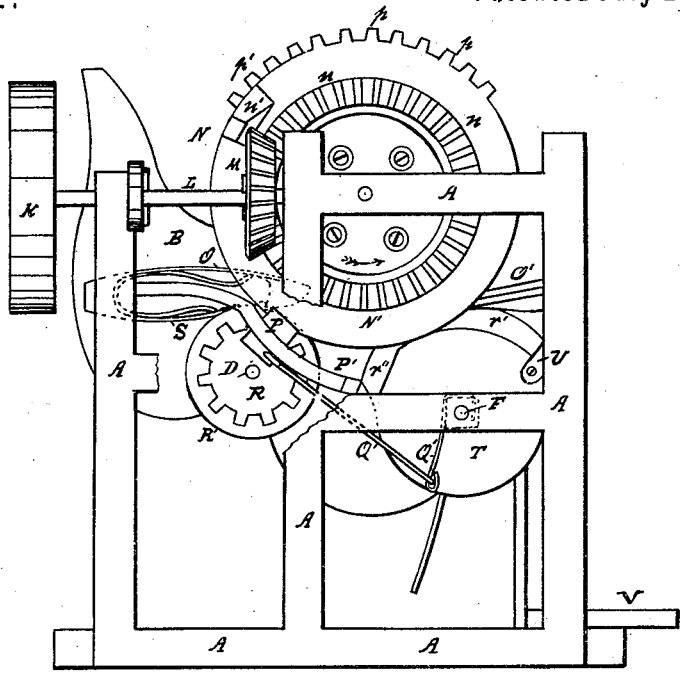
Figure 2:
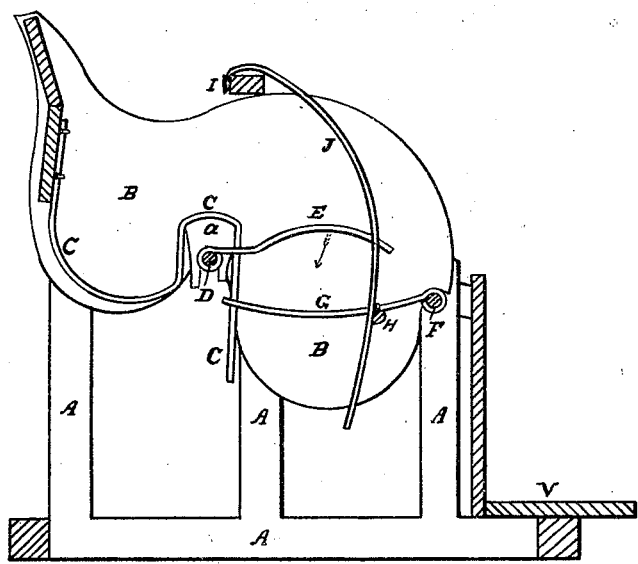
Figure 3:
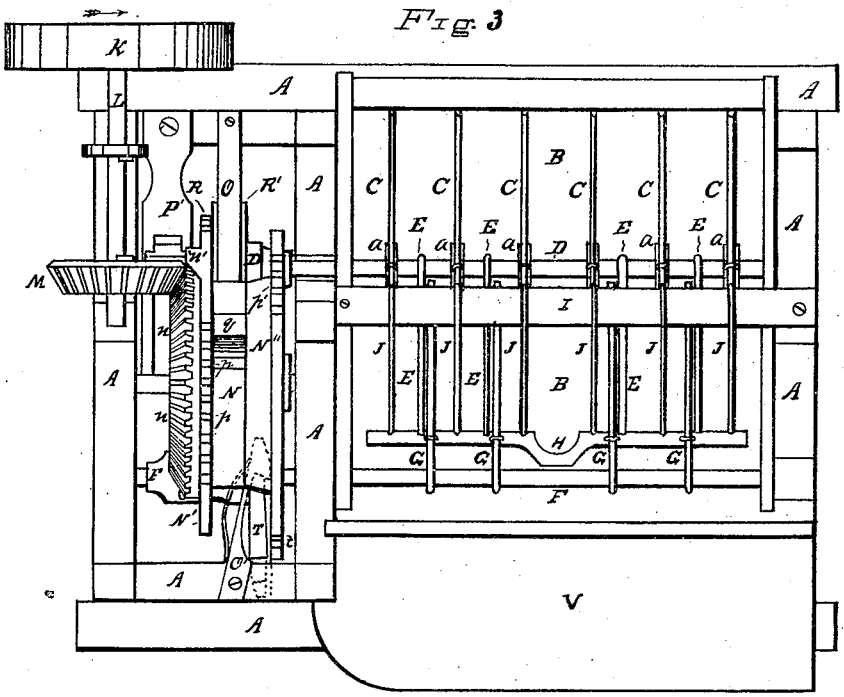
Figure 4:
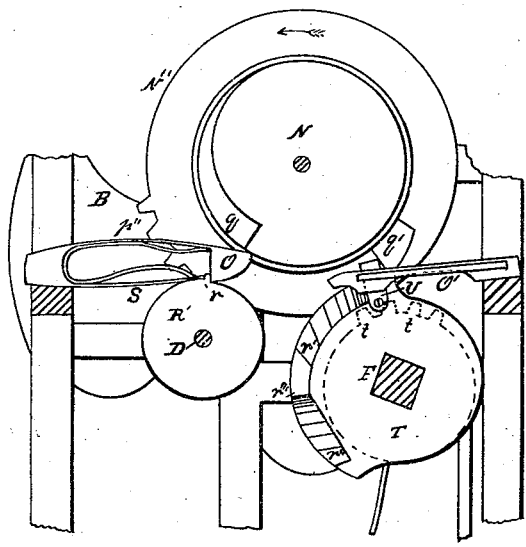

Figure 1 is an end view of my improved attachment, a part of the frame being broken away; Fig. 2, a vertical cross-section thereof; Fig. 3, a top or plan view of the same; Fig. 4, a transverse section.

Like letters of reference indicate like parts.

My object is to make an automatically-operative attachment for harvesters, by means of which attachment the cut grain will be received from the harvester and presented in compact bundles or gavels to binders riding on a platform carried by the implement, and which will deliver the bound bundles to the ground. For the purpose of accomplishing the objects above set forth, my invention consists of an attachment of this class in combination with a harvester provided with a binders' table. It also consists in certain novel features, substantially as hereinafter specified, relating to the construction and arrangement of the various parts of the attachment.

In the drawings, A represents the frame of the attachment. This frame may be constructed by extending the frame of the harvester to support the mechanism hereinafter described. B is a receiver or hopper, into which the cut grain is delivered from the harvester. C C are bent wires, which constitute the bottom of a part of the hopper. D is a horizontal shaft passing through the central part of the hopper. $a\ a$ are small blocks resting freely on the shaft D. The wires or rods C C are attached to the front of the hopper. Their direction is then downward, forward, and upward. They then pass over the blocks $a\ a$, which are preferably grooved to receive them, and to which they are attached, and then descend vertically for a considerable distance, as is clearly shown in Fig. 2, thus making a dish-shaped bottom to the hopper. The wires C C are also arranged a considerable distance apart from each other, as shown in Fig. 3. E E are bent fingers, rigidly attached to the shaft D, and arranged between the wires C C. F is a horizontal shaft extending across the rear part of the hopper. G G are fingers rigidly attached to the shaft F, and extending toward the shaft D, and to or between the vertical parts of the wires C C. H is a cross-bar attached to the fingers G G, and I is a cross-bar arranged over the central part of the hopper. J J are flexible guards attached to the bar I, and resting against the bar H, as shown. K is the driving-wheel, mounted on the shaft L, having bearings in the frame. M is a beveled gear-wheel on the shaft L. N is a wheel mounted on an arbor or axle having bearings in the frame. The outer face of the wheel N is provided with beveled cogs $n\ n$, arranged for engagement by the wheel K. $n'$ is a lug or projection on the outer face of the wheel N. The periphery of the wheel N is deeply grooved, forming flanges $N'$ and $N''$ thereon. $p\ p$ are cogs or spurs projecting from a part of the periphery of the flange $N'$, and $p'$ are cogs or spurs projecting in like manner from the flange $N''$. That part of the wheel N included between the flanges $N'$ and $N''$ is cut away and made cam-shaped, as shown at $q$, Fig. 4. $q'$ is a lug or projection on the inner face of the flange $N''$. O is a spring-catch or hook lying against the periphery of the wheel N. $O'$ is a like hook lying against the inner face of the flange $N''$. P is a sliding block riding in the curved way $P'$. Q is a pitman attached to the block P, and to an arm or rocker, $Q'$, rigidly attached to the shaft F. R is a spur-wheel rigidly mounted on the shaft D, and $R'$ is an eccentric rigidly attached to the same shaft, and provided with a spur, $r$. S is a spring-catch, arranged to engage the spur $r$. T is a disk rigidly attached to the shaft F, and provided with spurs $t\ t$, extending from its periphery. U is a lug or stop on the outer face of the disk T. The outer face of this disk is cut away near its edge, as represented at $r'\ r'''$, Fig. 4. The surfaces $r'$ and $r''$ are so inclined as to form the step or shoulder $r'''$. V is the binders' platform. The wheel N is to be rotated in the direction indicated by the arrow. The driving-wheel K may be rotated by means of a belt actuated by the harvester mechanism.

The operation of the mechanism above described is as follows: By the time the cut grain is delivered in the hopper in sufficient quantity to form a gavel or bundle, the spurs $p\ p$ have reached the wheel R, and the continued movement of the wheel N causes the fingers E E to move around in the direction indicated by the arrow shown in Fig. 2. The continued movement of these fingers lifts the cut grain from the forward part of the hopper and carries it toward the rear part, and by the time the fingers discharge the grain the spurs $p'\ p'$ have reached the spurs $t\ t$, and the fingers G G are thereby raised to a horizontal position, as shown in Fig. 2. The bundle is thus firmly pressed while being bound. The guards J J are not absolutely essential, but I deem it preferable to employ them in the manner described, for the purpose of preventing the grain from being thrown from the hopper, and to assist in holding the bundle compactly while it is being bound. By the time the bundle is bound the lug $n'$ has reached the block P, which is thereby moved rearward until the fingers G G are carried to a vertical position, thus releasing the bound bundle, and dumping it upon the ground. The rotation or rocking movement of the shaft F, which results in carrying the fingers G G to a horizontal position, return the block P for another engagement by the lug $n'$. When the fingers G G are in a vertical position the head of the hook O rests against the radial face or shoulder formed by the cut $q$, and thus prevents the wheel N from being turned in the wrong direction. As the wheel N is rotated the hook O is pushed downward and engages one side of the spur $r$ by the time the bundle is dropped. This engagement is released as soon as the head of the hook is freed, and the wheel R may then be rotated by the engagement therewith of the spurs $p\ p$. The spurs $p\ p$ carry the wheel R around once, and the spring S then rests against the spur $r$, thus preventing this wheel from being turned in the wrong direction. The hook O' engages the lug or stop U when the fingers G G are in a vertical position, and they are thereby held in that position until the spurs $p\ p$ engage the spurs $t\ t$. By the time the fingers G G reach a horizontal position the hook O' engages the shoulder or stop $r'''$, and thus retains them in that position. Just before the lug $n'$ reaches the block P the lug $q'$ reaches the catch O', and releases it, the said catch and lug being beveled so that the catch may be readily pushed from the shoulder $r'''$ during the rotation of the wheel N. By this means the movement of all the parts is rendered positive and certain, and the mechanism cannot be moved in the wrong direction and displaced. The intermittent rotary movement of the fingers E E, and the rocking movement of the fingers G G, may be accomplished in various ways, but I deem it preferable to employ the means described for that purpose.

It will be perceived from the foregoing description that the cut grain gathered by the harvester will be delivered automatically in detached bundles to the binders on the platfrom, and that it will be firmly held while being bound, and then dumped upon the ground.

Having thus described my invention, what I claim as new, and desire to secure by Letters Patent, is—

1. The combination of the hopper B, arranged to receive the cut grain from the harvester, the fixed wires or rods C C constituting the bottom of the hopper, the intermittently-rotating fingers E E, the rocker-fingers G G, and the binders' platform, substantially as and for the purposes specified.

2. In combination, the wheel M, the wheel N, the hooks O and O', the shaft D, provided with the fingers E E, the wheel R and disk R', the catch S, the shaft F, provided with the fingers G G and disk T, and the sliding block P connected to the shaft F by means of the pitman Q and the arm Q', the hopper B, and platform V, all constructed, arranged, and operating substantially as described, for the purposes set forth.

DAVID A. GLENN.

Witnesses:
H. O. ROGERS,
FRANK BATS.